(12) United States Patent
Raynesford

(10) Patent No.: US 10,318,779 B2
(45) Date of Patent: Jun. 11, 2019

(54) SYSTEMS AND METHODS FOR ROBUST PROTECTION OF ITEM AUTHENTICATION, TRACKING AND TRACING AGAINST TAG DUPLICATION

(71) Applicant: Steven J. Raynesford, Mission Viejo, CA (US)

(72) Inventor: Steven J. Raynesford, Mission Viejo, CA (US)

(73) Assignee: Sensormatic Electronics LLC, Boca Raton, FL (US)

( * ) Notice: Subject to any disclaimer, the term of this patent is extended or adjusted under 35 U.S.C. 154(b) by 0 days.

(21) Appl. No.: 15/964,697

(22) Filed: Apr. 27, 2018

(65) Prior Publication Data

US 2018/0314868 A1  Nov. 1, 2018

Related U.S. Application Data

(60) Provisional application No. 62/491,921, filed on Apr. 28, 2017.

(51) Int. Cl.
| | |
|---|---|
| *G06K 7/10* | (2006.01) |
| *G06K 7/14* | (2006.01) |
| *H04L 9/30* | (2006.01) |
| *G06K 19/06* | (2006.01) |
| *H04L 9/32* | (2006.01) |
| *H04L 9/08* | (2006.01) |

(52) U.S. Cl.
CPC ....... *G06K 7/1413* (2013.01); *G06K 7/10712* (2013.01); *G06K 19/06028* (2013.01); *H04L 9/0894* (2013.01); *H04L 9/30* (2013.01); *H04L 9/3236* (2013.01)

(58) Field of Classification Search
CPC ............ G06K 7/1413; G06K 7/10712; G06K 19/06028; H04L 9/0894; H04L 9/30; H04L 9/3236
See application file for complete search history.

(56) References Cited

U.S. PATENT DOCUMENTS

| | | | |
|---|---|---|---|
| 9,256,881 B2* | 2/2016 | Engels | .............. H04W 4/80 |
| 2018/0174097 A1* | 6/2018 | Liu | .............. G06Q 10/0833 |

* cited by examiner

*Primary Examiner* — Seung H Lee
(74) *Attorney, Agent, or Firm* — Fox Rothschild LLP; Robert J. Sacco; Carol E. Thorstad-Forsyth

(57) ABSTRACT

Systems and methods for facilitating tag authenticity validation. The methods comprise: detecting a tag's arrival/presence at a waypoint along a supply chain path; obtaining a ChainStart Value and a first ChainEnd Value from the tag; generating a public key and a private key; transforming the first ChainEnd Value into a second ChainEnd Value using the private key; storing in a data store at least a hash of the ChainStart Value, a hash of the second ChainEnd Value, and the public key as a transaction record entry; causing the first ChainEnd Value of the tag to be replaced with the second ChainEnd Value; and validating the tag's authenticity at a second waypoint along the supply chain path using at least the ChainStart Value, the second ChainEnd Value, and the transaction record entry comprising the hash of the ChainStart Value, a hash of the first ChainEnd Value and the public key.

22 Claims, 10 Drawing Sheets

Transaction Record Entries 1000

| Transaction Record Entry | Hash of CS | Hash of CE | Public Key | Transaction Block | Signed Hashed Transaction Block |
|---|---|---|---|---|---|
| TR1 | Hash of $NV_0$ | Hash of $NV_1$ | First Public Key | $TB_1$ | Signed Hashed $TB_1$ |
| TR2 | Hash of $NV_0$ | Hash of $NV_2$ | Second Public Key | $TB_2$ | Signed Hashed $TB_2$ |
| TR3 | Hash of $NV_0$ | Hash of $NV_3$ | Third Public Key | $TB_3$ | Signed Hashed $TB_3$ |
| TR4 | Hash of $NV_0$ | Hash of $NV_4$ | Fourth Public Key | $TB_4$ | Signed Hashed $TB_4$ |

FIG. 10

SYSTEMS AND METHODS FOR ROBUST PROTECTION OF ITEM AUTHENTICATION, TRACKING AND TRACING AGAINST TAG DUPLICATION

CROSS-REFERENCE TO RELATED APPLICATIONS

This application claims priority to U.S. Provisional Patent Application 62/491,921, filed on Apr. 28, 2017. The contents of which are incorporated herein by reference in its entirety.

BACKGROUND

Statement of the Technical Field

The present disclosure relates generally to tag based systems. More particularly, the present disclosure relates to implementing systems and methods for robust protection of item authentication, tracking and tracing against tag duplication.

Description of the Related Art

Tag based systems are used in a retail setting for inventory management and related security applications. In an RFID type of tag based system, a reader transmits a Radio Frequency ("RF") carrier signal to an RFID device. The RFID device responds to the carrier signal with a data signal encoded with information stored by the RFID device. Increasingly, passive RFID labels are used in combination with Electronic Article Surveillance ("EAS") labels in retail applications. Each RFID label includes a Tag Identifier ("TID"). The TIDs can be obtained by a nefarious person, and used to create copies of the RFID labels. The RFID label copies are coupled to counterfeit items. This creates difficulties in relation to verifications of the RFID labels' and/or items' authenticity.

Optical tag tracking and tracing systems are widely used. However, with no protection from identical copies, there is no provision for verifying authenticity. ID codes embedded in electronic devices (such as computers and cell-phones) allow identifying and provide varying degrees of authenticity verification.

SUMMARY

The present disclosure generally concerns implementing systems and methods for facilitating tag authenticity validation. The methods comprise: detecting a tag's arrival or presence at a waypoint along a supply chain path; obtaining, by a processor, a ChainStart Value and a first ChainEnd Value from the tag; generating, by the processor, a first key pair comprising a public key and a private key; transforming, by the processor, the first ChainEnd Value into a second ChainEnd Value using the private key; storing in a data store a hash of the ChainStart Value, a hash of the second ChainEnd Value, the public key, a transaction block, and/or a signed hashed transaction block as a transaction record entry; causing the first ChainEnd Value of the tag to be replaced with the second ChainEnd Value; and validating the tag's authenticity at a second waypoint along the supply chain path using at least the ChainStart Value, the second ChainEnd Value, the transaction record entry, and a first another transaction record entry comprising the hash of the ChainStart Value, a hash of the first ChainEnd Value and the public key.

In some scenarios, the tag comprises a wireless communications enabled tag (e.g., an RFID or NFC tag), a printed barcode, an etched barcode, or other method of affixing an ephemeral or graphical representation of a numerical value. The processor is disposed in at least one of the tag, a tag reader/writer device, or a computing device remote (e.g., a server) from the tag and the tag reader/writer device.

The second ChainEnd Value comprises the first ChainEnd Value signed with the first private key. The validating comprises using the first public key to un-sign the second ChainEnd Value to obtain a previous ChainEnd Value. The tag's authenticity is validated when (1) the previous ChainEnd Value matches the first ChainEnd Value contained in the another transaction record entry and (2) the first ChainEnd Value is the same as the ChainStart Value.

In those scenarios or other scenarios, the first waypoint is a first intermediary waypoint along the supply chain path, and the process is repeated at a second intermediary waypoint along the supply chain path. Accordingly, the methods further comprise: detecting the tag's arrival or presence at a second intermediary waypoint along the supply chain path; obtaining the ChainStart Value and the second ChainEnd Value from the tag; generating a second key pair comprising a public key and a private key; transforming the second ChainEnd Value into a third ChainEnd Value using the private key of the second key pair; storing in the data store at least the hash of the ChainStart Value, a hash of the third ChainEnd Value, and the public key of the second key pair as a second another transaction record entry; and causing the second ChainEnd Value of the tag to be replaced with the third ChainEnd Value. The third ChainEnd Value and the second another transaction record entry are also used to validate the tag's authenticity.

BRIEF DESCRIPTION OF THE DRAWINGS

The present solution will be described with reference to the following drawing figures, in which like numerals represent like items throughout the figures.

FIG. 10 is an illustration of illustrative transaction record entries in a data store.

DETAILED DESCRIPTION

Figure 1:
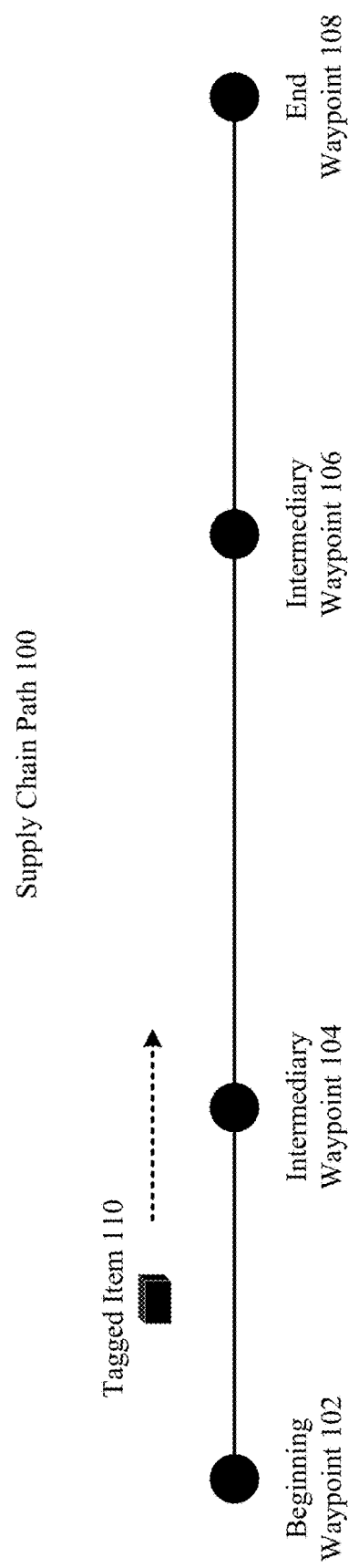
FIG. 1 is an illustration of an illustrative supply chain path.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Product authentication and track-and-trace systems rely on the uniqueness of an identification number stored in an associated tag, marker or label. The terms "tag", "marker" and label are used herein interchangeably. The tag can be an RFID tag, an NFC tag, an optical code, or other marking or recording of data values that can be made unique. In RFID tags, the unique number is called a TID. The TID is both unique and read-only.

RFID tags with writeable TIDs are possible. Tags based in barcodes or 2D optical codes are inherently not unique. This means tags should not be considered unique if they are used to protect value.

Increasingly valuable products are authenticated with fixed-TID tags, in markets that support billions of dollars of counterfeit traffic. Therefore, there is an increasing incentive and demand among counterfeiters for tags that can be written with the same "unique" data as stored in an authentic tag. Given that tags can be copied in limited form today and can be made fully cloneable, robust long-term authentication, tracking and tracing cannot be based solely on unique write-once tag TIDs.

In view of the forgoing, the present solution generally concerns systems and methods for robust protection of item authentication, tracking and tracing against tag duplication. The tag may include, but is not limited to, a wired or wireless communication enabled tag (e.g., an RFID tag or an NFC tag), an optical barcode, an engraving, or any other item encoding or representing the required data. The methods involve: storing at least one relatively large numerical value in a tag; and dynamically modifying the numerical value at each waypoint in a tagged item's path of travel (e.g., a supply chain path or distribution path). The numerical value is referred to herein as the "ChainEnd Value". The ChainEnd Value is modified cryptographically to link (or chain) the current waypoint to the previous waypoint. The ChainEnd Value stored in a tag is then a unique encoding of all the waypoints in the path of travel through which the tag has passed. The ChainEnd Value is written to a data store at each waypoint. The data store contains an immutable record of all transactions for the given tag.

A copy made of a tag at any point will be invalidated when the original valid tag is updated as expected at the next waypoint. The original tag is still valid with a new ChainEnd Value stored in a local memory and in a remote data store. The copied tag is now invalid because it contains a previous ChainEnd Value that has been superseded in the journey of the authentic item. A counterfeit item cannot traverse the entire authentic supply chain and receive transactions at each of the legitimate and expected waypoints. This lack will be revealed at any point when the chain for the counterfeit device is traced.

The data fields including the ChainEnd Value are cryptographically generated large numbers that cannot be guessed or derived from previous knowledge. Cryptographic methods are well known in the art, and therefore will not be described herein. Any known or to be known cryptographic methods can be used herein without limitation. Guessing is fruitless because the numerical range or space may be extremely large. The present solution removes the need for special hardware to provide and protect the tag's identity, and instead relies on mathematical constructs that are exceedingly difficult to spoof.

Referring now to FIG. 1, there is an illustration of an illustrative supply chain path 100 for a tagged item 110 (e.g., a piece of merchandise). The supply chain path 100 comprises a plurality of waypoints 102-108. Each waypoint is a physical location to which the tagged item travels. In some scenarios, the waypoints comprise, but are not limited to, a tag originator facility, a manufacturer facility, a port facility, a distribution center facility, and a retail store.

Figure 2:
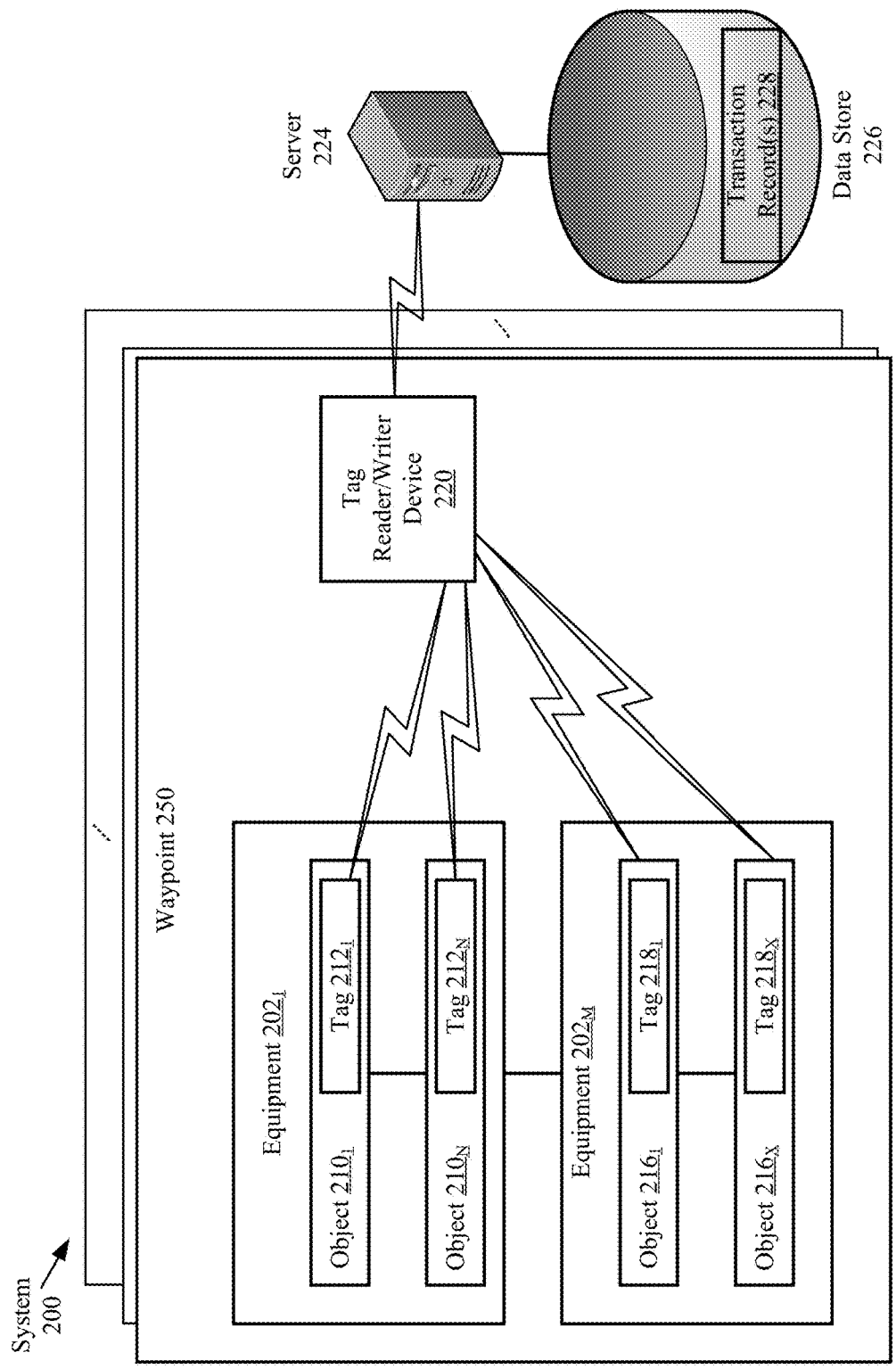
FIG. 2 is an illustration of an illustrative system.

Referring now to FIG. 2, there is provided an illustration of an illustrative system 200 including a plurality of waypoints 250. Each of the waypoints 102-108 of FIG. 1 is the same as or similar to waypoints 250. As such, the discussion of waypoints 250 is sufficient for understanding waypoints 102-108 of FIG. 1.

The system 200 is generally configured to allow improved inventory counts of objects and/or items located within a waypoint, as well as an improved technique for identifying tags in a supply chain path that fail a test of authenticity. Accordingly, system 200 comprises a plurality of waypoints. Equipment $202_1, \ldots, 202_M$ (collectively referred to as "202") is disposed in each waypoint 250. The equipment is provided for structurally supporting and/or storing objects (or items) $210_1$-$210_N$ (collectively referred to as "210"), $216_1$-$216_x$ (collectively referred to as "216"). The equipment can include, but is not limited to, conveyers, boxes, crates, shipping containers, shelves, cabinets, displays, and/or fixtures.

The waypoint 250 also includes at least one tag reader/writer device 220 configured to assist in counting the objects 210, 216 located within the waypoint 250, as well as detect items present thereat that have failed a test of authenticity. Tag readers/writer devices are well known in the art, and therefore will not be described in detail herein. Any known tag reader/writer can be used herein without limitation. In some scenarios, the tag reader/writer device 220 includes, but is not limited to, an RFID tag interrogation device, an NFC tag interrogation device, a barcode scanner, a barcode printer, a laser engraver (e.g., for creating etched barcodes), or any combination thereof.

Tags $212_1$-$212_N$ (collectively referred to as "212"), $218_1$-$218_x$ (collectively referred to as "218") are respectively attached or coupled to the objects 110, 116. The tags are described herein as comprising single-technology tags (e.g., that are only barcode, RFID or NFC enabled). The present solution is not limited in this regard. More than one identical technology tag may be used for additional storage and/or redundancy. The tags can alternatively or additionally comprise multi-technology tags. For example, the tags have both EAS and RFID capabilities. The present solution is not limited in this regard.

Notably, the one or more tag reader/writer devices 220 are strategically placed at a location within the waypoint 250 such that ChainEnd Value modifications are made prior to the tags 212, 218 leaving the waypoint 250. In this regard, the tag reader/writer device 220 is communicatively coupled to a server 224. The server 224 can be located at the waypoint 250 or at another remote site as shown in FIG. 2. Server 224 may optionally be partitioned and operate in a distributed manner. The server 224 is configured to receive tag related information from the tag reader/writer device 220, process the received tag related information, and store the same in a data store 226. Data store 226 may optionally be partitioned and operate in a distributed manner.

During operation, the tag reader/writer device 220 and/or server 224 is/are configured to modify ChainEnd Values for read tags. The manner in which the ChainEnd Values are modified will be discussed in detail below. The modified ChainEnd Values are stored in the data store 226, and provided to the tags (e.g., either via an RFID communication, an NFC communication, a printed label, an engraving, or storage in the memory of a digital device).

Figure 3:
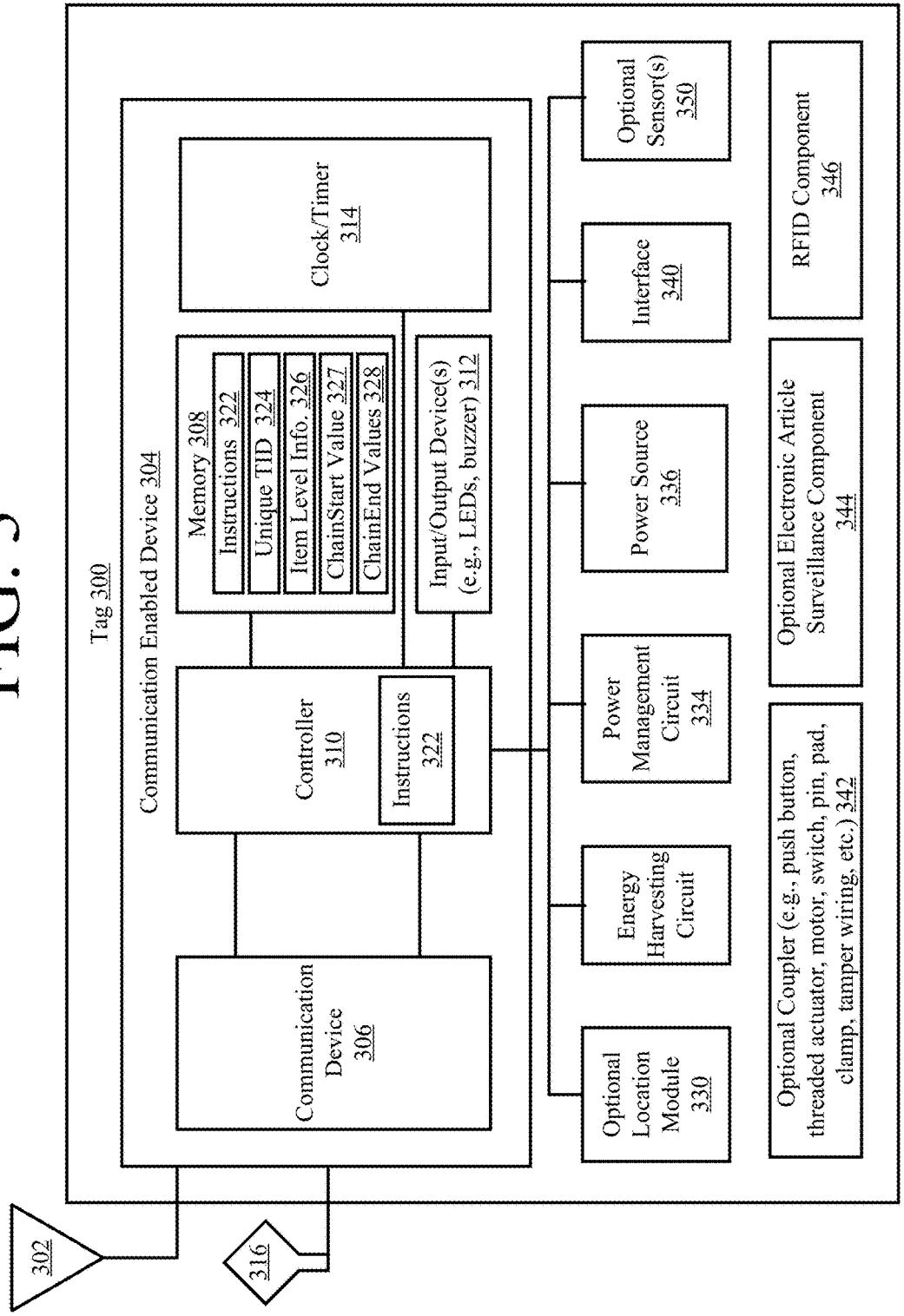
FIG. 3 is an illustration of an illustrative architecture for a tag.

Referring now to FIG. 3, there is an illustration of an illustrative architecture for a wireless communication enabled tag 300. One or more of the tags $212_1$, ..., $212_N$, $218_1$, ..., $218_x$ can be the same as or similar to tag 300. As such, the discussion of tag 300 is sufficient for understanding the tags 212, 218 of FIG. 2.

It should be noted that the tag 300 is shown as comprising an RFID type of tag. The present solution is not limited in this regard. Alternative, the tag comprises an optical storage type of tag or a digital device with storage in memory. Optical tags and labels are write-once, then read-only.

The tag 300 can include more or less components than that shown in FIG. 3. However, the components shown are sufficient to disclose an illustrative embodiment implementing the present solution. Some or all of the components of the tag 300 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 3 represents a representative tag 300 configured to facilitate improved inventory management and authenticity detection. In this regard, the tag 300 is configured for allowing data to be exchanged with an external device (e.g., tag reader/writer 220 of FIG. 2 and/or server 224 of FIG. 2) via wireless communication technology. The wireless communication technology can include, but is not limited to, a RFID technology, an NFC technology, and/or an SRC technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wired, wireless or optical communication technology can be used herein without limitation.

The components 306-314 shown in FIG. 3 may be collectively referred to herein as a communication enabled device 304, and include a memory 308 and a clock/timer 314. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 300. The update of the firmware, in case of issues, can also be performed remotely.

As shown in FIG. 3, the communication enabled device 304 comprises at least one antenna 302, 316 for allowing data to be exchanged with the external device via a wireless communication technology (e.g., an RFID technology, an NFC technology and/or a SRC technology). The antenna 302, 316 is configured to receive signals from the external device and/or transmit signals generated by the communication enabled device 304. The antenna 302, 316 can comprise a near-field or far-field antenna. The antennas include, but are not limited to, a chip antenna or a loop antenna.

The communication enabled device 304 also comprises a communication device (e.g., a transceiver or transmitter) 306. Communication devices (e.g., transceivers or transmitters) are well known in the art, and therefore will not be described herein. However, it should be understood that the communication device 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., object 210 or 212 of FIG. 2) to which the tag 300 is coupled.

The communication enabled device 304 facilitates the automatic and dynamic modification of item level information 326 and ChainEnd Value(s) 328 that is being or is to be output from the tag 300 in response to certain trigger events. The trigger events can include, but are not limited to, the tag's arrival at a particular facility, the tag's arrival in a particular country or geographic region, a date occurrence, a time occurrence, a price change, the reception of an information request, and/or the reception of user instructions.

The item level information 326, a ChainStart Value 327, a ChainEnd Value 328, and a unique identifier ("TID") 324 for the tag 300 can be stored in memory 308 of the communication enabled device 304 and/or communicated to other external devices (e.g., tag reader/writer device 220 of FIG. 2 and/or server 224 of FIG. 2) via communication device (e.g., transceiver) 306 and/or interface 340 (e.g., an Internet Protocol or cellular network interface). The external device (e.g., server) can then store the information in a database (e.g., database 226 of FIG. 2) and/or use the information for various purposes.

In some scenarios, the tag 300 implements the protocol in a state-machine that is not a traditional instruction CPU. The instructions are defined in the RFID air-interface protocol specification as defined by an organization called EPC-Global. The instructions are given to the controller sequentially by the reader. Accordingly, the communication enabled device 304 also comprises a controller 310 and input/output devices 312. The controller 310 can execute instructions 322 implementing methods for facilitating inventory counts and management. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the tag 300. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the tag 300 and that cause the tag 300 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 300 and/or for notifying the person of a particular pricing status (e.g., on sale status) of the item to which the tag is coupled.

The clock/timer 314 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 300 also comprises an optional location module 330. The location module 330 is generally configured to determine the geographic location of the tag at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 342 is provided to securely or removably couple the tag 300 to an item (e.g., object 210 or 212 of FIG. 2). The coupler 342 includes, but is not limited to, a mechanical coupling means (e.g., a strap, clip, clamp, snap) and/or adhesive (e.g., glue or sticker). The coupler 342 is optional since the coupling can be achieved via a weld, chemical bond, and/or other means of capturing and holding the tag to the item (e.g., object 210 or 212 of FIG. 2).

The tag 300 can also include a power source 336, an optional EAS component 344, and/or an RFID component 246. Each of the listed components 336, 344, 346 is well known in the art, and therefore will not be described herein. Any known or to be known battery, EAS component and/or RFID component can be used herein without limitation. The power source 336 can include, but is not limited to, a rechargeable battery and/or a capacitor.

The power management circuit 334 is generally configured to control the supply of power to components of the tag 300. In the event all of the storage and harvesting resources deplete to a point where the tag 300 is about to enter a shutdown/brownout state, the power management circuit 334 can cause an alert to be sent from the tag 300 to a remote device (e.g., tag reader/writer device 220 or server 224 of FIG. 2). In response to the alert, the remote device can inform an associate (e.g., a store employee) so that (s)he can investigate why the tag 300 is not recharging and/or holding charge.

Figure 4:
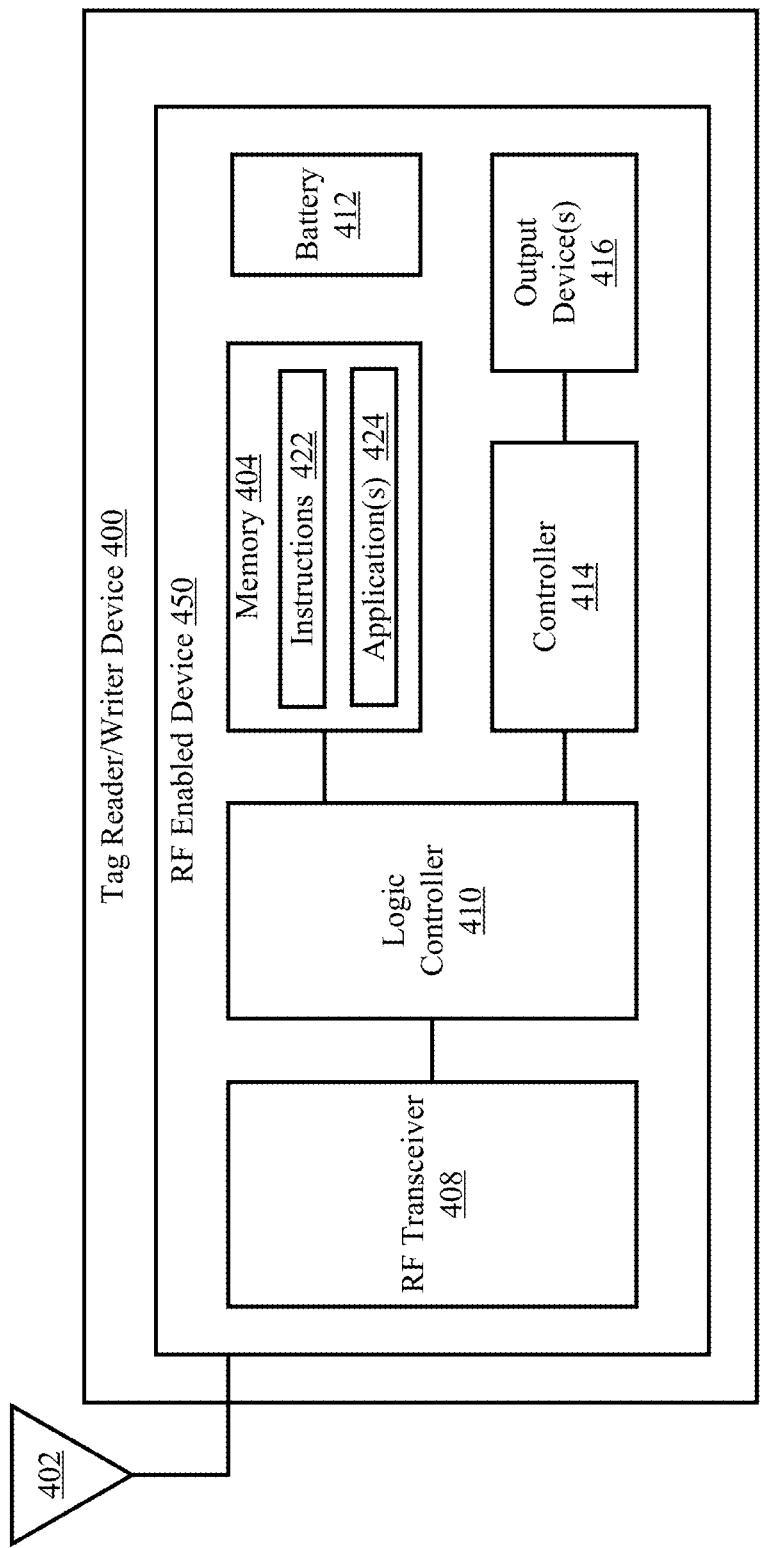
FIG. 4 is an illustration of an illustrative architecture for a tag reader/writer device.

Referring now to FIG. 4, there is provided a detailed block diagram of an illustrative architecture for a tag reader/writer device 400. Tag reader/writer device 220 of FIG. 2 is the same as or similar to tag reader/writer device 400. As such, the discussion of tag reader/writer device 400 is sufficient for understanding tag reader/writer device 220.

Tag reader/writer device 400 may include more or less components than that shown in FIG. 4. However, the components shown are sufficient to disclose an illustrative embodiment implementing the present solution. Some or all of the components of the tag reader/writer device 400 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 4 represents an illustration of a representative tag reader/writer device 400 configured to facilitate improved inventory counts and authenticity detection within a supply chain (e.g., supply chain 100 of FIG. 1). In this regard, the tag reader/writer device 400 comprises an RF enabled device 450 for allowing data to be exchanged with an external device (e.g., tags $212_1, \ldots, 212_N, 218_1, \ldots, 218_x$ of FIG. 2) via a wireless technology (e.g., an RF technology). The components 404-

416 shown in FIG. 4 may be collectively referred to herein as the RF enabled device 450, and may include a power source 412 (e.g., a battery) or be connected to an external power source (e.g., an AC mains).

The RF enabled device 450 comprises an antenna 402 for allowing data to be exchanged with the external device via RF technology (e.g., RFID technology or other RF based technology). The external device may comprise tags 212, 218 of FIG. 2 and/or tag 300 of FIG. 3. In this case, the antenna 402 is configured to transmit RF carrier signals (e.g., interrogation signals) to the listed external devices, and/or transmit data response signals (e.g., authentication reply signals) generated by the RF enabled device 450. In this regard, the RF enabled device 450 comprises an RF transceiver 408. RF transceivers are well known in the art, and therefore will not be described herein. However, it should be understood that the RF transceiver 408 receives RF signals including information from the transmitting device, and forwards the same to a logic controller 410 for extracting the information therefrom. The RF enabled device 450 may also include GPS and other sensors providing information pertinent to the waypoint.

The extracted information can be used to determine the presence, location and/or authenticity of a tag within a facility (e.g., waypoint 200 of FIG. 2). Accordingly, the logic controller 410 can store the extracted information in memory 404, and execute algorithms using the extracted information. For example, the logic controller 410 can obtain a ChainEnd Value and compare the same to a previously stored ChainEnd Value to determine if a match exists therebetween. Other operations performed by the logic controller 310 will be apparent from the following discussion.

Notably, memory 404 may be a volatile memory and/or a non-volatile memory. For example, the memory 404 can include, but is not limited to, a RAM, a DRAM, an SRAM, a ROM, and a flash memory. The memory 404 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 422 are stored in memory for execution by the RF enabled device 450 and that cause the RF enabled device 450 to perform any one or more of the methodologies of the present disclosure. The instructions 422 are generally operative to facilitate determinations as to whether or not tags are present within a facility, where the tags are located within a facility, and/or which tags are in transit at any given time. Other functions of the RF enabled device 450 will become apparent as the discussion progresses.

Figure 5:
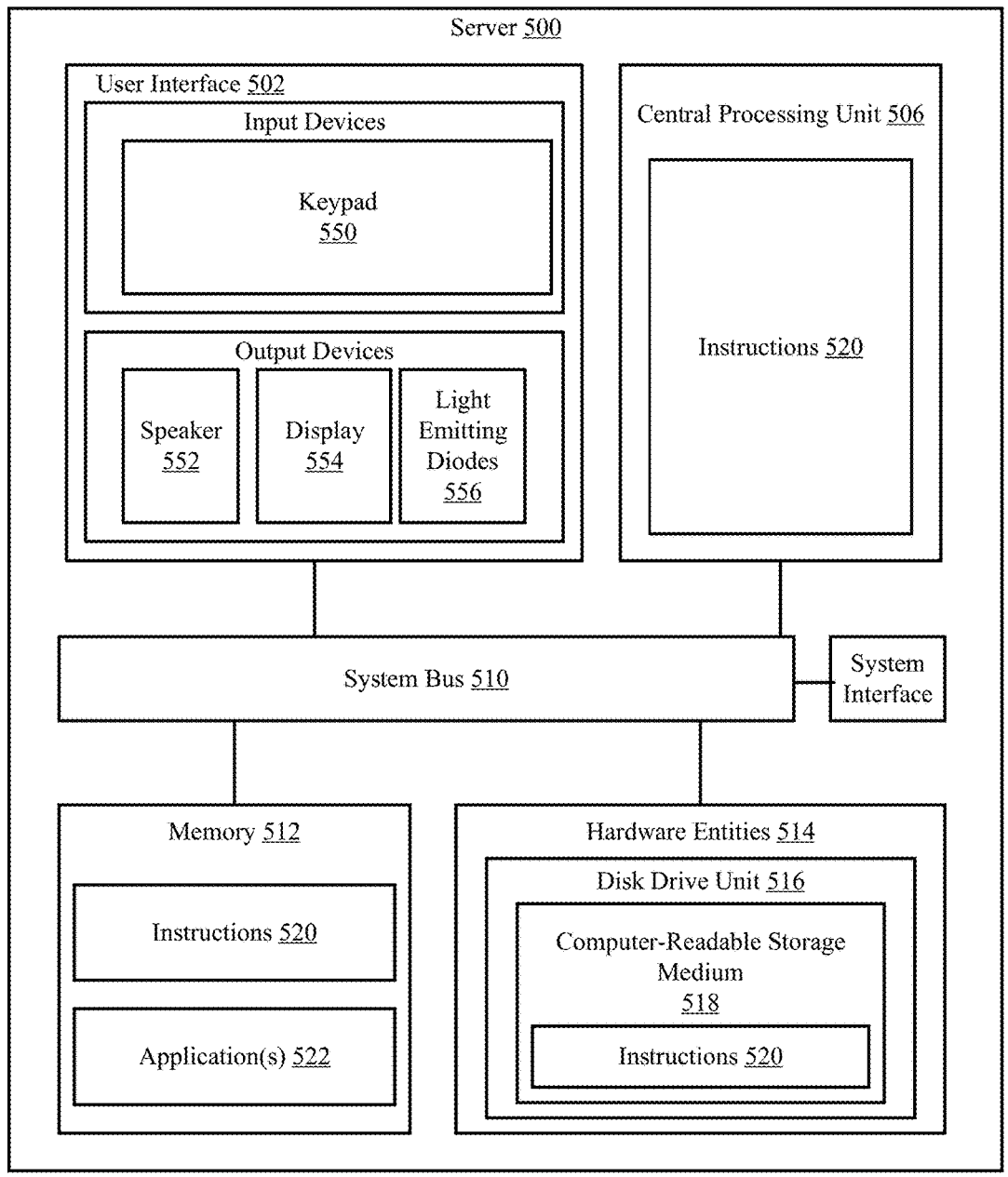
FIG. 5 is an illustration of an illustrative architecture for a server.

Referring now to FIG. 5, there is provided a detailed block diagram of an illustrative architecture for a server 500. Server 224 of FIG. 2 is the same as or substantially similar to server 500. As such, the following discussion of server 500 is sufficient for understanding server 224.

Notably, the server 500 may include more or less components than those shown in FIG. 5. However, the components shown are sufficient to disclose an illustrative embodiment implementing the present solution. The hardware architecture of FIG. 5 represents one embodiment of a representative server configured to facilitate inventory counts and authenticity detections. As such, the server 500 of FIG. 5 implements at least a portion of a method for robust protection of item authentication, tracking and tracing against tag duplication in accordance with the present solution.

Some or all the components of the server 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the server 500 comprises a user interface 502, a CPU 506, a system bus 510, a memory 512 connected to and accessible by other portions of server 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the server 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the server 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the server 500 and that cause the server 500 to perform any one or more of the methodologies of the present disclosure.

In some scenarios, the hardware entities 514 include an electronic circuit (e.g., a processor) programmed to facilitate inventory counts and authenticity detections. In this regard, it should be understood that the electronic circuit can access and run a software application 522 installed on the server 500. The software application 522 is generally operative to facilitate: ChainEnd Value modifications; ChainEnd storage; and/or tag authenticity determinations. Other functions of the software application 522 will become apparent as the discussion progresses.

Figure 6:
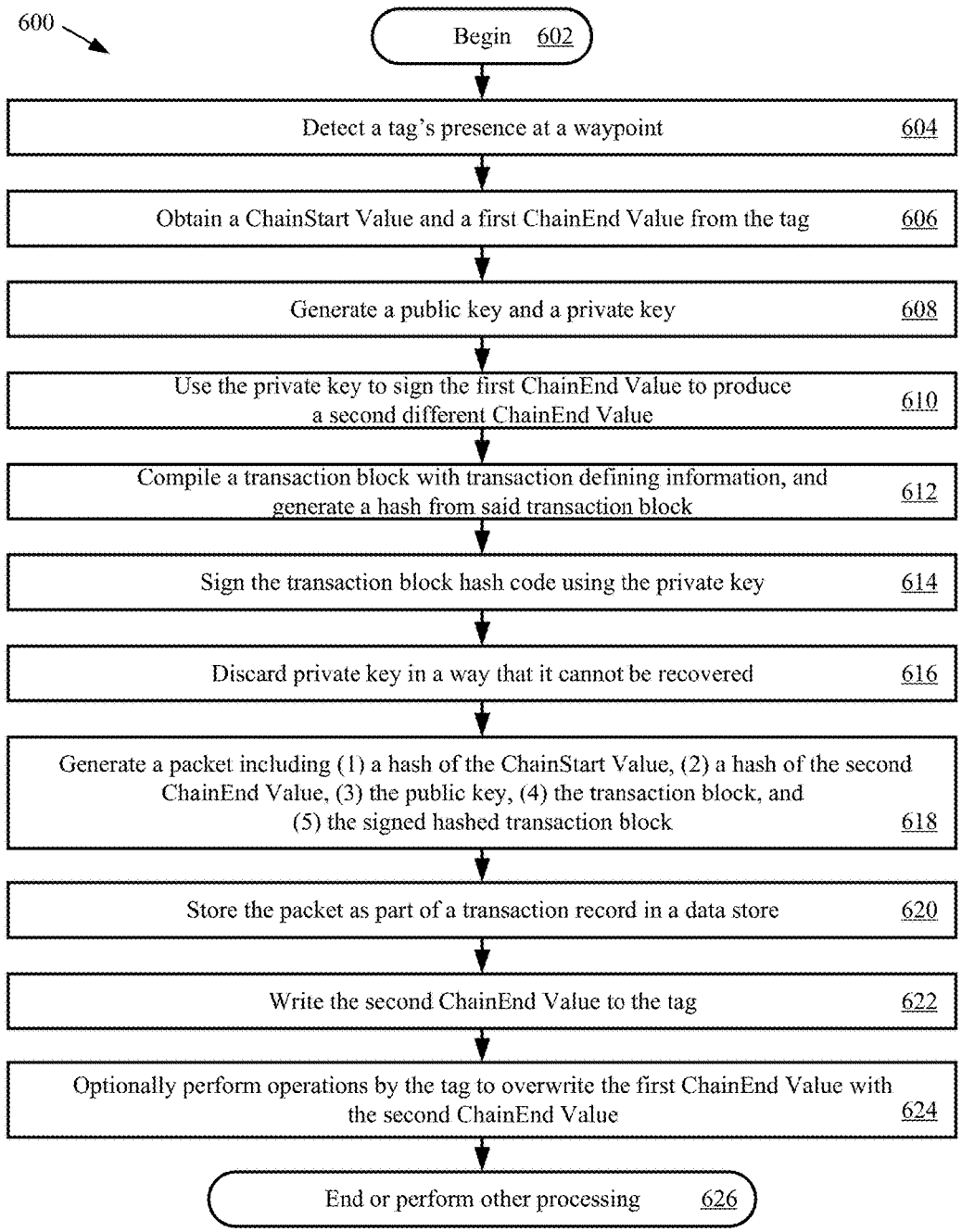
FIG. 6 is a flow diagram of an illustrative method for modifying a ChainEnd Value stored locally at a tag.

Referring now to FIG. 6, there is provided a flow diagram of an illustrative method 600 for modifying a ChainEnd Value (e.g., ChainEnd Value 328 of FIG. 3) in accordance with the present solution. Method 600 is performed at each waypoint (e.g., waypoint 102, 104, 106 or 108 of FIG. 1) for each tag (e.g., tag 110 of FIG. 1, 212, 218 of FIG. 2 and/or 300 of FIG. 3) read by the tag reader/writer device (e.g., tag reader/writer device 220 of FIG. 2 and/or 400 of FIG. 4).

Method 600 begins with 602 and continues with 604 where the tag's presence is detected at a waypoint (e.g., waypoint 104 of FIG. 1) by the tag reader/writer device. This detection can be made simply by reading or scanning the tag. Next in 606, the tag reader/writer device obtains a Chain- Start Value (e.g., ChainStart Value 327 of FIG. 3) and a first ChainEnd Value (e.g., ChainEnd Value 328 of FIG. 3) from the tag. The sequence is illustrative and other sequences may be used to provide similar results.

In some scenarios, the ChainEnd Value modification is performed by the tag reader/writer device. In other scenarios, the ChainEnd Value modification is performed by a remote server (e.g., server 224 of FIG. 2). In this case, 606 can also involve communicating the ChainStart Value and the first ChainEnd Value from the tag reader/writer device to the server. The ChainStart and first ChainEnd Values include, but are not limited to, numbers. In some scenarios, the ChainEnd Value modification is performed by the tag device.

In next 608, a key pair is generated by the tag reader/writer device or the server. The key pair comprises a public key and private key. Methods for generating key pairs, public keys, and private keys are well known in the art, and therefore will not be described herein. Any known or to be known method for generating key pairs, public keys, and private keys can be used herein without limitation.

The private key is used in 610 to sign the first ChainEnd Value. The signed first ChainEnd Value is referred to here as a second ChainEnd Value. Methods for cryptographically signing data are well known in the art, and therefore will not be described herein. Any known or to be known method for cryptographically signing data can be used herein without limitation.

In 612, a transaction block is hashed. The transaction block comprises transaction defining information. Techniques for hashing data are well known in the art, and therefore will not be described herein. Any known or to be known technique for hashing data can be used herein without limitation. The transaction block includes relevant information for a given waypoint of the tags journey. The transaction block may be plain text or encrypted text. The format of the transaction block is selected in accordance with a given application. The transaction block is signed using the private key, as shown by 614.

Illustrative transaction blocks are shown in the following TABLE 1.

TABLE 1

| Transaction Block Created By Intermediary Manufacturer Waypoint | |
| --- | --- |
| Vendor: | Acme |
| Station: | 12A |
| Reader ID Hash: | Kbng8VCRY44kp33gbHpLoBN9 |
| Operation: | "34B 26L modification" |
| DateTime: | Jan. 1, 2018 08:34:52.124 |
| Transaction Block Created By An Intermediary Waypoint | |
| Join: | CEhash: PAwrolm8MBiv |
|  | CEhash: xi9WuEVYkhu |
|  | CEhash: 9nvnbBVQdgou |
| Vendor: | Acme |
| Station: | 12a |
| Reader ID Hash: | LhG2U0Sr37uye6SQi66gDfix |
| DateTime: | Jan. 1, 2018 08:34:51.482 |

In 616, the private key is discarded in a way that it cannot be recovered. A packet is then generated in 618. The packet includes (1) a hash of the ChainStart Value, (2) a hash of the second ChainEnd Value, (3) the public key, (4) the transaction block, and (5) the signed hash of the transaction block. The packet is then stored as part of a transaction record (e.g., transaction record 228 of FIG. 2) in a data store (e.g., data store 226 of FIG. 2), as shown by 620. The second ChainEnd Value is then written to the tag in 622 by the tag reader/writer device. If the tag is a wireless communication enabled tag (e.g., an RFID tag), then the tag performs operations in optional 624 to overwrite the first ChainEnd Value with the second ChainEnd Value in its local memory (e.g., memory 308 of FIG. 3). Subsequently, 626 is performed where method 600 ends or other processing is performed (e.g., return to 604 so that the process is repeated for a next tag).

Although the operations of blocks 608-620 of method 600 are described above as being performed by the tag reader/writer device and/or server, the present solution is not limited in this regard. Alternatively, these operations can be performed by the tag in response to a trigger event. The trigger event can include, but is not limited to, a date, a time, and/or a detection that the tag has arrived at a given waypoint or is leaving a given waypoint. In this case, the tag would have knowledge of the transaction block.

Method 600 can be performed iteratively for each tag detected at a given waypoint. Also, method 600 is performed at each waypoint along a supply chain path for any given tag. An illustration that is useful for understanding the implementation of method 600 in a supply chain path 100 is provided in FIG. 7.

Figure 7:
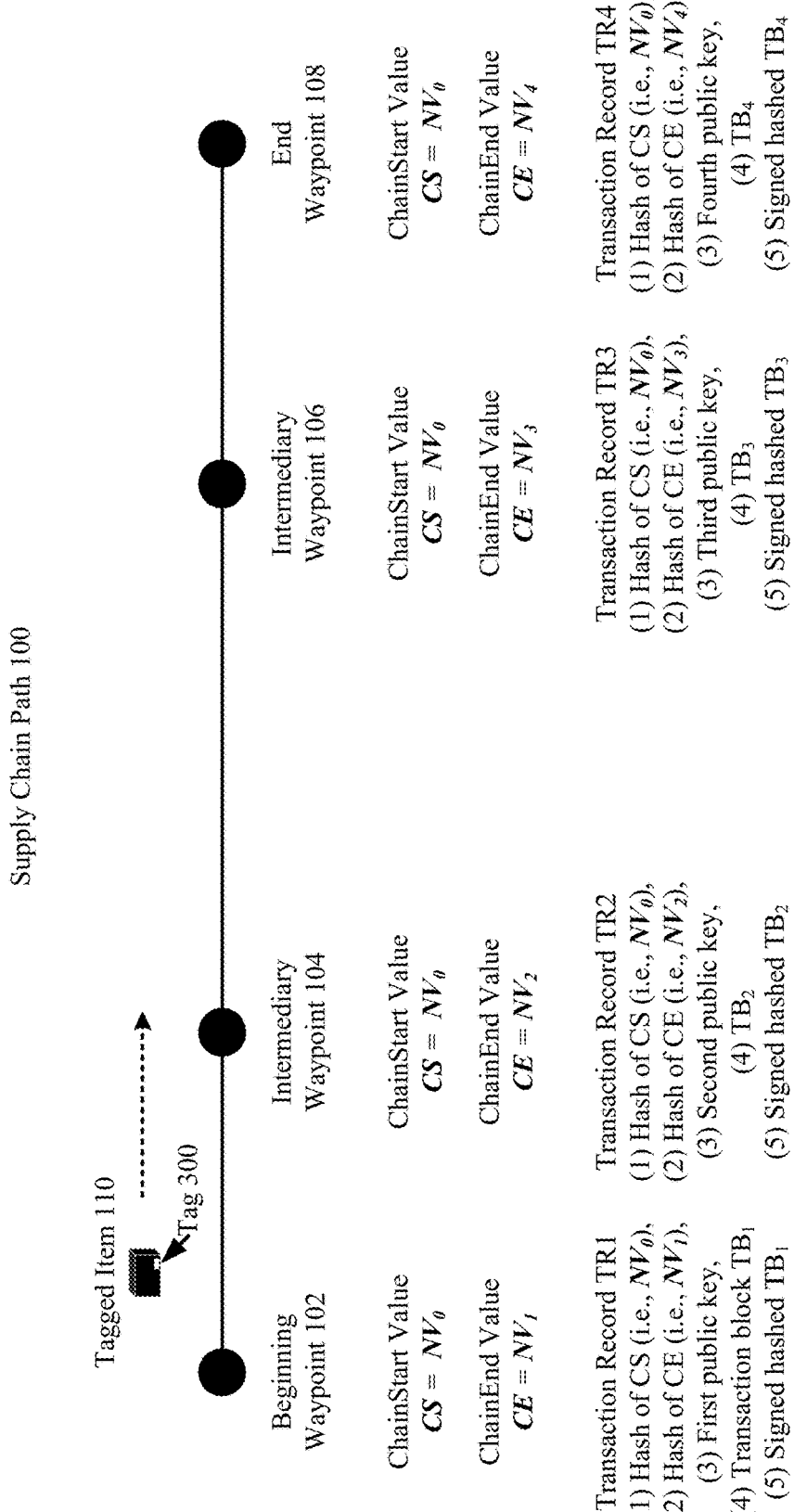
FIG. 7 is an illustration that is useful for understanding an iterative process using the method of FIG. 6.

As shown in FIG. 7, a tagged item 110 travels along the supply chain path 100 from a beginning waypoint 102 to an end waypoint 108 via two intermediary waypoints 104, 106. Method 600 is performed for the tagged item 100 at each waypoint 104-108.

At the beginning waypoint 102 (e.g., a tag originator), the tag 300 (coupled to the item 110) has a ChainStart Value 327 and a ChainEnd Value 328 stored in its local memory 308. The ChainStart Value 327 is defined by the following Mathematical Expression (1).

$$CS=NV_0 \qquad (1)$$

where CS represents the ChainStart Value 327, and $NV_0$ represents an initial numerical value. The determination of the value of $NV_0$ may be random, sequential, tied to another sequence, etc. The ChainEnd Value 328 is defined by the following Mathematical Expression (2).

$$CE=NV_0 \qquad (2)$$

where CE represents the ChainEnd Value 328. Notably, at the beginning waypoint 102, both the ChainStart Value 327 and the ChainEnd Value 328 are set equal to $NV_0$. After method 600 is applied, a first transaction record ("TR1") is stored in the data store (e.g., data store 226 of FIG. 2). TR1 comprises (1) a hash of the ChainStart Value $NV_0$, (2) a hash the ChainEnd Value $NV_1$, (3) a first public key, (4) a first transaction block ("$TB_1$"), and (5) a signed hashed $TB_1$.

At the intermediary waypoint 104, a second iteration of method 600 is performed to modify the ChainEnd Value 328. In accordance with method 600, a third value $NV_2$ is generated by signing the second value $NV_1$ using a second private key. The third value $NV_2$ is written to the tag 300. The tag 300 overwrites the stored second value $NV_1$ with the third value $NV_2$ such that the ChainEnd Value 328 is now defined by the following Mathematical Expression (3).

$$CE=NV_2 \qquad (3)$$

A second transaction record ("TR2") is stored in the data store (e.g., data store 226 of FIG. 2). TR2 comprises (1) a hash of the ChainStart Value $NV_0$, (2) a hash the ChainEnd Value $NV_2$, (3) a second public key, (4) a second transaction block ("$TB_2$"), and (5) a signed hashed $TB_2$.

At the intermediary waypoint 106, a third iteration of method 600 is performed to once again modify the ChainEnd Value 328. In accordance with method 600, a fourth value $NV_3$ is generated by signing the third value $NV_2$ using a third different private key. The fourth value $NV_3$ is written to the tag 300. The tag 300 overwrites the stored third value $NV_2$ with the fourth value $NV_3$ such that the ChainEnd Value 328 is now defined by the following Mathematical Expression (4).

$$CE = NV_3 \quad (4)$$

A third transaction record ("TR3") is stored in the data store (e.g., data store 226 of FIG. 2). TR3 comprises (1) a hash of the ChainStart Value $NV_0$, (2) a hash the ChainEnd Value $NV_3$, (3) a third public key, (4) a third transaction block ("$TB_3$"), and (5) a signed hashed $TB_3$.

At the end waypoint 108, a fourth iteration of method 600 is performed to once again modify the ChainEnd Value 328. In accordance with method 600, a fifth value $NV_4$ is generated by signing the fourth value $NV_3$ using a fourth different private key. The fifth value $NV_4$ is written to the tag 300. The tag 300 overwrites the stored fourth value $NV_3$ with the fifth value $NV_4$ such that the ChainEnd Value 328 is now defined by the following Mathematical Expression (5).

$$CE = NV_4 \quad (5)$$

A fourth transaction record ("TR4") is stored in the data store (e.g., data store 226 of FIG. 2). TR4 comprises (1) a hash of the ChainStart Value $NV_0$, (2) a hash the ChainEnd Value $NV_4$, (3) a fourth public key, (4) a fourth transaction block ("$TB_4$"), and (5) a signed hashed $TB_4$.

The present solution is not limited to the particulars of FIG. 7. As noted above, the tag can include a printed or etched barcode, rather than an RFID tag. In this case, a new barcode is affixed or etched over or adjacent to the old barcode(s). The tag can include, but is not limited to, storage in memory of a tracked or tracking digital device.

Figure 8:
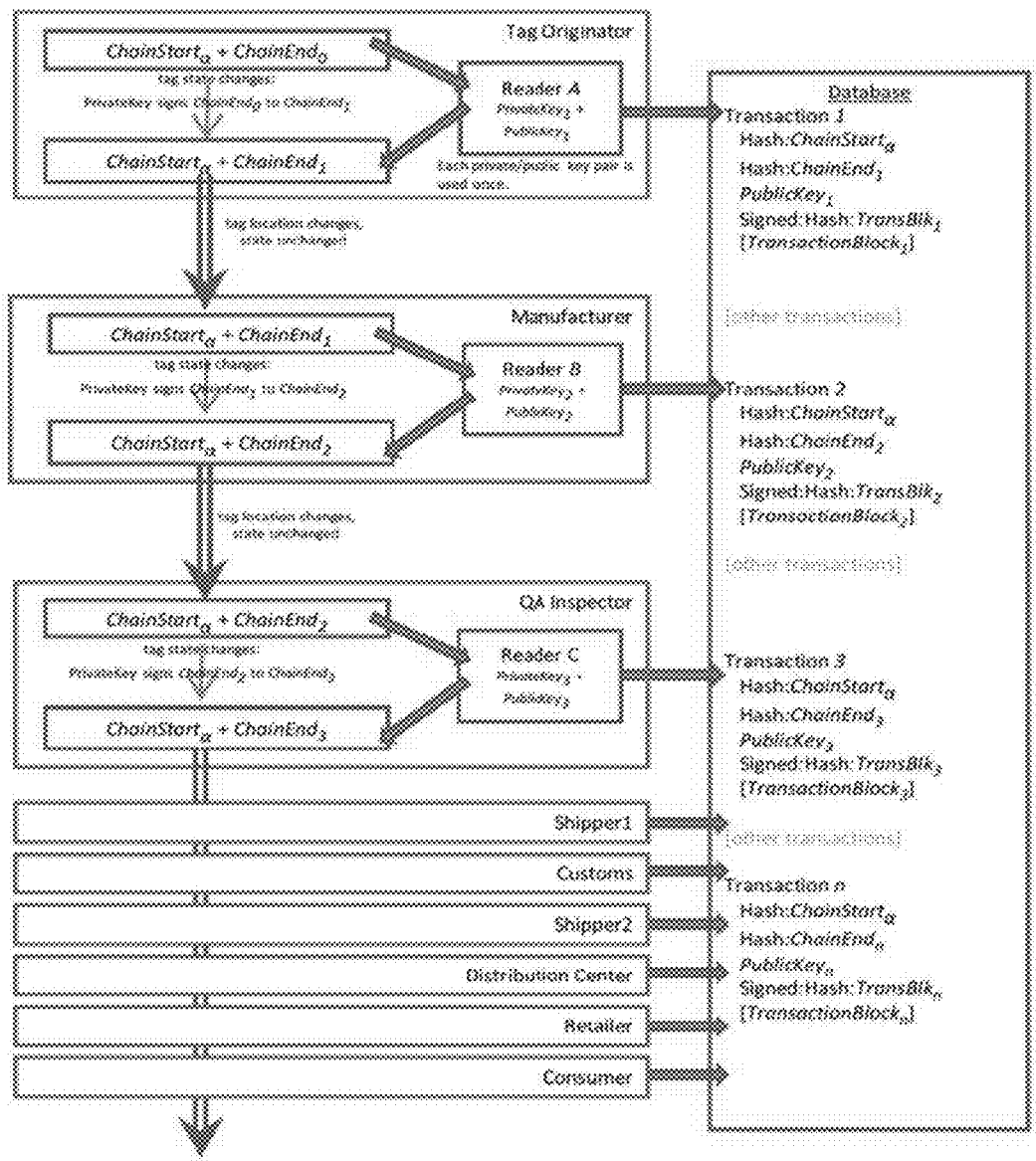
FIG. 8 is another illustration that is useful for understanding an iterative process using the method of FIG. 6.

Another illustration is provided in FIG. 8 that is useful for understanding the implementation of method 600 in a supply chain path. A tagged item's journey may have as many waypoints as needed. Also, no additional storage is needed by the tag to implement the present solution. Each waypoint performs the same operation on the tag data and updates the data store. No waypoint needs information on prior or subsequent waypoints except that information contained in the tag.

Figure 9:
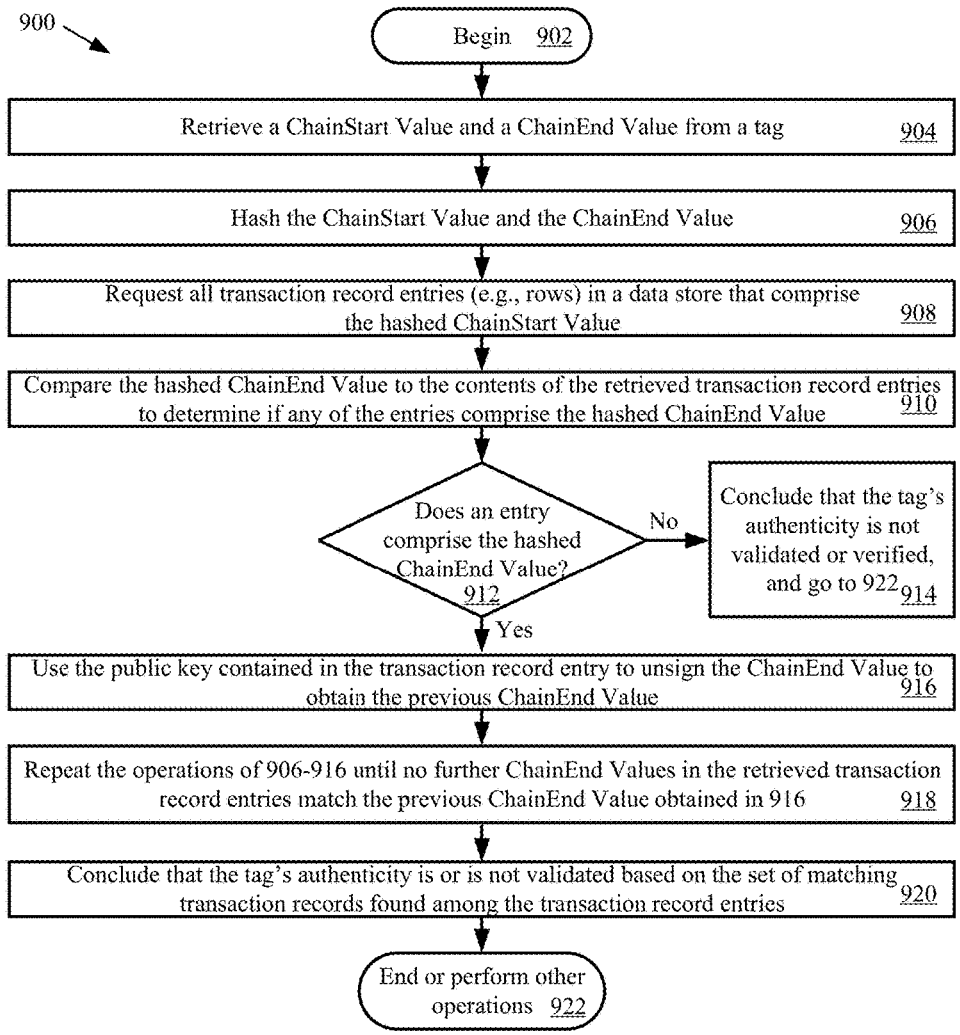
FIG. 9 is a flow diagram of an illustrative method for validating or verifying a tag's authenticity.

Referring now to FIG. 9, there is provided a flow diagram of an illustrative method 900 for validating or verifying a tag's (e.g., tag 110 of FIG. 1, 212, 218 of FIG. 2 and/or 300 of FIG. 3) authenticity. An authentic chain will contain the specific public keys that sequentially revert the tag's current ChainEnd Value (e.g., ChainEnd Value $NV_4$ of FIG. 7) all the way back to the originating value (e.g., $NV_0$ of FIG. 7). The authenticity of an item is tested by tracing the ChainEnd Values back to the originating value. An authentic tag contains the ChainStart Value and ChainEnd Values that correspond to an authentic chain.

The present solution relies on well-defined one-way hashing and public-private key encryption and verification algorithms. The ChainStart Value and ChainEnd Values are relatively large numbers (e.g., ≥96 bits). Brute-force guessing attacks are not practical. Cryptographically secure encryption and hashing functions have no known backdoors and provide no shortcuts to brute-force guessing. Post-quantum cryptographic methods may be implemented as needed.

As shown in FIG. 9, method 900 begins with 902 and continues with 904 where a ChainStart Value (e.g., $NV_0$ of FIG. 7) and a ChainEnd Value (e.g., $NV_4$ of FIG. 7) are retrieved from the tag (e.g., by a tag reader/writer device 400 of FIG. 4). These retrieved values are hashed in 906. The hashed ChainStart Value (e.g., hashed $NV_0$) is used in 908 to retrieve all transaction record entries from a data store (e.g., data store 226 of FIG. 2) that comprise the hashed ChainStart Value. An illustration of illustrative data store transaction record entries 1000 is provided in FIG. 10. If the hashed ChainStart Value is the hash of $NV_0$, then the transaction record entries TR1, TR2, TR3, TR4 are retrieved from the data store. Each transaction record entry comprises (1) a hash of CS, (2) a hash of CE, (3) a public key, (4) a transaction block, and (5) a signed hashed transaction block.

Referring again to FIG. 9, method 900 continues with 910 where the hashed ChainEnd Value (e.g., hashed $NV_4$) is compared to the contents of the retrieved transaction record entries (e.g., transaction record entries TR1, TR2, TR3, TR4) to determine if any of the entries comprises the hashed ChainEnd Value. With reference to FIG. 10, the transaction record entry TR4 is identified in 910 if the hashed ChainEnd Value is the hash of $NV_4$.

If a transaction record entry does not comprise the hashed ChainEnd Value [912:NO], then 914 is performed where a conclusion is made that the tag's authenticity cannot be validated or verified by the retrieved transaction records. Method 900 then continues with 922, where it ends or other operations are performed (e.g., a counterfeit detection scheme is initiated).

If a transaction record entry does comprise the hashed ChainEnd Value [912:YES], then 916 is performed where the public key (e.g., the fourth public key) is used to unsign the ChainEnd Value (e.g., $NV_4$) resulting from a previous ChainEnd Value (e.g., $NV_4$).

The above described process of 906-916 is repeated until no further ChainEnd Value in the retrieved transaction record entries match the previous ChainEnd Value obtained in 916 (e.g., either the ChainEnd Value equals the ChainStart Value and/or none of any remaining retrieved transaction records match the hashed $CE_n$), as shown by 918. When this occurs, a conclusion is made that the tag's authenticity is or is not verified, as shown by 920, to the extent of the matching transaction records. Waypoints included in the decryption chain are verified as included in the tag's journey. An arbitrary set of business rules can be used here to make such a conclusion. Each business rule is a rule that defines a scenario in which a tag's authenticity is or is not verified. For example, a business rule states that a tag's authenticity is verified when a ChainEnd Value equals the ChainEnd Start Value or a ChainEnd Value of a record of a plurality of retrieved transaction records specifying a first waypoint of the tag's journey or a given portion of the tag's journey. Subsequently, 922 is performed where method 900 ends or other processing is performed.

For any valid ChainEnd Value that is known, the chain can be constructed from there back to the start. Actual non-hashed ChainEnd Values are only available and known when they are read from a tag. This information is read from the tag by a waypoint tag reader/writer device, but is neither retained by the device nor recorded in the data store transaction record entries. Only such devices with authentication will report the ChainEnd Value. Each ChainEnd Value is associated with a transaction block that must be correct, consistent with a known-good journey. If all of the transaction entries are authentic waypoints, then the item has an authentic journey to the extent contained in or provided by those waypoints. Authenticity may also include heuristic, signature or fingerprint detections based on differentiating counterfeiting operations from authentic operations as well as data from authenticated transaction blocks generated at the associated waypoints.

It is possible for a first tag to have a ChainEnd Value that was generated at an intermediary waypoint (e.g., waypoint 106 of FIG. 1) and for a second tag to have a ChainEnd Value generated at the end waypoint (e.g., waypoint 108 of FIG. 1). The authenticity of the first tag is only validated from the beginning waypoint (e.g., waypoint 102 of FIG. 1) to said intermediary waypoint. The authenticity of the second tag is validated from the same beginning waypoint to said end waypoint. The first tag made by copying the second tag at an intermediary waypoint will be partially validated back to same transaction as the second tag. However, the second tag will have completed subsequent waypoint transactions and will ultimately have ChainEnd Value calculation spanning those subsequent waypoints. The contents of the first tag are not sufficient to include in its validation chain those transactions that occurred subsequent to the intermediary waypoint, preventing it from obtaining the same extent of validation as the second tag.

Validation of the transaction block data associated with each waypoint is by using the public key to recover the stored TB hash from the signed hashed TB value in the transaction record and then to verify that it matches a temporary hash made of the TB in the transaction record. Failure to match has values indicates that the TB record in the transaction record has been altered from the original TB generated at the associated waypoint.

The process of authenticating a tag through data store tracing is itself a type of waypoint function. The authentication results may also be logged in a data store as a type of transaction and may optionally also invoke method 600 on the authenticated tag recording the transaction. Authentication updates provide continued authentication entries for an item that is not in transition, such as an item for sale on a store shelf.

Verifying authenticity of a tag depends on the verifier having access to the data store with the stored transaction records. This could be in the form of a public-facing blockchain or database containing the authenticating portion of the data. Additional information may remain hidden, including the manufacturer identity, shippers, etc. that are not generally considered public information and not needed to verify authenticity.

An authentic tag may be copied at any point and for a time both tags will appear authentic. However, the counterfeit tag will permanently differ from the authentic tag at the next waypoint. The authentic tag will continue on its authentic journey and its ChainEnd Value will update to reflect the continued authentic journey. The copied tag will continue on its own journey with different ChainEnd Values from the authentic tag. The copied tag cannot simply be updated with the ChainEnd Value found in the authentic tag unless the counterfeiter again has access to read the updated authentic tag. The contents of the authentic tag can only be determined by reading the tag, they cannot be determined from any data store entry. The counterfeit tag will have a ChainEnd Value that is located in the data store, but it will correspond to a transaction that is not the expected final waypoint of an authentic product.

The following EXAMPLES are provided to illustrate certain implementations of the present solution. The following EXAMPLES are not intended to limit the present solution in any way.

EXAMPLE 1

Origination of Tag and Journey

A ChainStart Value is chosen to be $NV_0$. The ChainEnd Value is set to the ChainStart Value (i.e., $CE=NV_0$). At a first waypoint (e.g., a tag originator), the ChainEnd Value stored in the tag is updated in accordance with a private/public key pair, and a packet is generated including the transaction block information. The contents of the packet are entered into the data store (e.g., an enterprise database or an enterprise in blockchain) as a transaction record entry, whereby this unique tag ChainEnd Value is recorded. At this point, the tag is initiated and is available for any use in the system.

EXAMPLE 2

Splitting or Branching a Journey

The splitting or branching of a journey allows an item to be tracked using a plurality of tags. A first tag can be used to track a first branch of the item's journey. A second tag can be used to track a second branch of the item's journey, and so on. At any point in the journey, the same tag can be used to track at least one other item in addition to the item at issue.

For example, a plurality of boxes are shipped in a shipping container. Each box houses a plurality of items. A single first tag is used to track all of the item contained in the shipping container along the first branch of their journey.

At an end waypoint of the first branch, some of the boxes are removed from the shipping container and placed in a truck. A tag is affixed to the truck such that a single second tag is used to track all the items contained in the boxes being carried by the truck along the second branch of their journey. The transaction block of the second tag contains a reference to the journey of the first tag.

At an end waypoint of the second branch, the boxes are each distributed to a different delivery vehicle. A third tag is coupled to each box. The third tags allow for the boxes to be individually tracked along their respective third branches of their journeys.

The present solution is not limited to the particulars of this example. For example, in other scenarios, one or more joins may occur in addition to the splits. The taggant may be changed to another medium at each split or join, such as from an RFID tag to a QR coded label.

In some scenarios, in order to split a tag, a transaction is posted with the original tag's ChainStart Value and ChainEnd Value, plus the same for each of the tags to be used in the split. The original tag may be used as part of the split, discarded or used to represent the collection of split tags. This status is part of the transaction on the original tag.

The journey splitting/branching scenarios, apply to retail applications. For example, T-shirts are manufactured and source-tagged with initiated RFID tags but these tags are not individually updated until a point is reached where the T-shirts are individually tracked. This point is likely a distribution center or a retail store. Until that point, they are represented by a single tag identifying the block of T-shirts in a box.

As another example, a sample of product or evidence is removed from a lot associated with a single tag. A split tag is associated with the sample from the lot and the original tag remains with the lot.

EXAMPLE 3

Joining Journeys

Items on two journeys may be joined into a single item. Multiple joins can occur, and can be combined with splits. One single tag can be joined with other tags in either a single operation or multiple operations over time. Each combination represents a separate journey from that point on. This allows: a tracked item to be traced back to the source of multiple items; failed tag replacements (e.g., a failed tag can be physically replaced with a new tag and joined to each other in the data store); and an item's association with declarations from regulatory agencies (e.g., UL, FCC, FDA) and regulatory declarations (e.g., ETSI DoC, etc.).

In some scenarios, a physician issues a prescription in the form of a transaction on the database tied to a tag given to the patient. The journey of the portion of the drugs dispensed are joined with the prescription. Only one pharmacy can fulfill the prescription and only the patient can retrieve the fulfilled prescription according to identification embedded in the prescription transaction.

In another scenarios, a shipping container is loaded with tagged products and sealed with an RFID container seal. The container seal journey is joined with each of the journeys of the products in the container.

EXAMPLE 4

Terminating a Journey

The ChainEnd Value is updated and the chain termination transaction is made. Further updates to the ChainEnd Value are not considered valid, even if found in the data store. An illustrative use case for this implementation is a Journey that should not continue after a final transaction.

In some scenarios, a pharmacy fulfills a prescription with controlled drugs. The customer/patient is not permitted to resell the drugs and returns are not allowed. Once the prescription is filled, it is not legal to transfer the drugs again. Any subsequent tracking (e.g., during an investigation) is done as a new journey.

In other scenarios, a split transaction occurs. In the split transaction, the original journey may be terminated if all of the items were split and associated with new tag journeys and none of the items associated with the original journey remain.

EXAMPLE 5

Virtual Tags and Site Tags

Many products originate in components, materials or ingredients that cannot be practically tagged. Examples are spinach in a field grown for months and ultimately sold in a packaged salad or minerals that are pulverized and refined.

To follow the spinach example, virtual tags are entries made in the data store during production recording conditions at the point of production. In the case of spinach, from initial cultivation to final harvesting. These events that may prove useful in establishing the provenance of an agricultural product: recording of irrigation events, overpasses by photographic aircraft with hashes of the photos, weather, identify a harvesting machine at specific locations in a field as it passes. At the time a tagged case is loaded with spinach a transaction is generated and stored, including the date, time and location of the case, and the location of an identified truck containing the case as it moves to a packing plant.

The virtual tag data recorded during the agricultural cycle of the spinach that was packed in that case is joined in the data store to the case tag allowing tracking back from the moment of packing in the case to the start of the agricultural cycle for the contents of that case. The forensic value of this data is not normally extracted or needed, yet in cases of food poisoning it allows tracing items back to their origins. Verification of claims about food sourcing may be verified through this data.

In site tag scenarios, farms, factories and warehouses can be sectioned with a combination of fixed tags that are read as equipment passes, providing a normalized data audit trail of other data entered into the database from that equipment.

EXAMPLE 6

Private Journeys

Any part of or all of an entry in the database may be encrypted when the transaction is recorded, hiding data associated with a particular ChainEnd Value. If the hash of the ChainEnd Value is encrypted, the entire journey is hidden from the point of encryption and earlier. Private journeys are unique to chained waypoint tracking.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for facilitating tag authenticity validation, comprising:
   detecting a tag's arrival or presence at a waypoint along a supply chain path;
   obtaining, by a processor, a ChainStart Value and a first ChainEnd Value from the tag;
   generating, by the processor, a first key pair comprising a public key and a private key;
   transforming, by the processor, the first ChainEnd Value into a second ChainEnd Value using the private key;
   storing in a data store at least a hash of the ChainStart Value, a hash of the second ChainEnd Value, and the public key as a transaction record entry;
   causing the first ChainEnd Value of the tag to be replaced with the second ChainEnd Value; and
   validating the tag's authenticity at a second waypoint along the supply chain path using at least the tag's ChainStart Value, the tag's second ChainEnd Value, and a first transaction record entry comprising the hash of the ChainStart Value, a hash of the second ChainEnd Value and the public key.

2. The method according to claim 1, wherein the processor is disposed in at least one of the tag, a tag reader/writer device, or a computing device remote from the tag and the tag reader/writer device.

3. The method according to claim 1, wherein the second ChainEnd Value comprises the first ChainEnd Value signed with the private key.

4. The method according to claim 3, wherein the validating comprises using the public key to un-sign the second ChainEnd Value to obtain a previous ChainEnd Value.

5. The method according to claim 4, wherein the tag's authenticity is incrementally validated when the previous ChainEnd Value matches the first ChainEnd Value contained in the another transaction record entry.

6. The method according to claim 5, wherein the method is repeated until no further matches are found among one or more transaction record entries creating a chain of linked transaction records.

7. The method according to claim 1, wherein the first waypoint is a first intermediary waypoint along the supply chain path.

8. The method according to claim 7, further comprising:
  detecting the tag's arrival or presence at a second intermediary waypoint along the supply chain path;
  obtaining the ChainStart Value and the second ChainEnd Value from the tag;
  generating a second key pair comprising a public key and a private key;
  transforming the second ChainEnd Value into a third ChainEnd Value using the private key of the second key pair;
  storing in the data store at least the hash of the ChainStart Value, a hash of the third ChainEnd Value, and the public key of the second key pair as a second another transaction record entry; and
  causing the second ChainEnd Value of the tag to be replaced with the third ChainEnd Value.

9. The method according to claim 8, wherein the third ChainEnd Value and the second another transaction record entry are also used to validate the tag's authenticity.

10. The method according to claim 1, wherein the transaction record entry further comprises a transaction block and a hash of the transaction block signed by the first private key.

11. The method according to claim 1, wherein the tag is a wired or wireless communications enabled tag, a printed barcode, an etched barcode, or an allocation of memory in a digital device.

12. A system, comprising:
  a processor; and
  a non-transitory computer-readable storage medium comprising programming instructions that are configured to cause the processor to implement a method for facilitating tag authenticity validation, wherein the programming instructions comprise instructions to:
    detect a tag's arrival or presence at a waypoint along a supply chain path;
    obtain a ChainStart Value and a first ChainEnd Value from the tag;
    generate a first key pair comprising a public key and a private key;
    transform the first ChainEnd Value into a second ChainEnd Value using the private key;
    store in a data store at least a hash of the ChainStart Value, a hash of the second ChainEnd Value, and the public key as a transaction record entry;
    cause the first ChainEnd Value of the tag to be replaced with the second ChainEnd Value; and
    validate the tag's authenticity using at least the tag's ChainStart Value, the tag's second ChainEnd Value, and a first transaction record entry comprising the hash of the ChainStart Value, a hash of the second ChainEnd Value and the public key.

13. The system according to claim 12, wherein the processor is disposed in at least one of the tag, a tag reader/writer device, or a computing device remote from the tag and the tag reader/writer device.

14. The system according to claim 12, wherein the second ChainEnd Value comprises the first ChainEnd Value signed with the private key.

15. The system according to claim 14, wherein the tag's authenticity is incrementally validated by using the public key to un-sign the second ChainEnd Value to obtain a previous ChainEnd Value.

16. The system according to claim 15, wherein the tag's authenticity is validated when the previous ChainEnd Value matches the first ChainEnd Value contained in the another transaction record entry.

17. The system according to claim 16, wherein the method is repeated until no further matches are found among one or more transaction record entries creating a chain of linked transaction records.

18. The system according to claim 12, wherein the first waypoint is a first intermediary waypoint along the supply chain path.

19. The system according to claim 18, wherein the programming instructions comprise instructions to:
  detect the tag's arrival or presence at a second intermediary waypoint along the supply chain path;
  obtain the ChainStart Value and the second ChainEnd Value from the tag;
  generate a second key pair comprising a public key and a private key;
  transform the second ChainEnd Value into a third ChainEnd Value using the private key of the second key pair;
  store in the data store at least the hash of the ChainStart Value, a hash of the third ChainEnd Value, and the public key of the second pair as a second another transaction record entry; and
  cause the second ChainEnd Value of the tag to be replaced with the third ChainEnd Value.

20. The system according to claim 19, wherein the third ChainEnd Value and the second another transaction record entry are also used to validate the tag's authenticity.

21. The system according to claim 12, wherein the transaction record entry further comprises a transaction block and a hash of the transaction block signed by the first private key.

22. The system according to claim 12, wherein the tag is a wired or wireless communications enabled tag, a printed barcode, an etched barcode, or an allocation of memory in a digital device.

* * * * *